United States Patent [19]

Miller et al.

[11] 4,132,175
[45] Jan. 2, 1979

[54] SWITCHING APPARATUS FOR MASS TRANSIT VEHICLE

[75] Inventors: Howard N. Miller, McMurray; William R. Segar, Monroeville, both of Pa.

[73] Assignee: Westinghouse Electric Corp., Pittsburgh, Pa.

[21] Appl. No.: 771,291

[22] Filed: Feb. 23, 1977

[51] Int. Cl.$^2$ ............................................. E01B 25/12
[52] U.S. Cl. ..................................... 104/130; 104/247
[58] Field of Search ................ 104/130, 245, 246, 247

[56] References Cited

U.S. PATENT DOCUMENTS

| | | | |
|---|---|---|---|
| 3,225,704 | 12/1965 | Gilvar et al. | 104/130 X |
| 3,593,668 | 7/1971 | Adams | 104/130 |
| 3,812,789 | 5/1974 | Nelson | 104/130 |
| 3,841,225 | 10/1974 | Johnson | 104/130 |

FOREIGN PATENT DOCUMENTS 299756 10/1928 United Kingdom ..................... 104/247

*Primary Examiner*—Albert J. Makay
*Assistant Examiner*—Randolph A. Reese
*Attorney, Agent, or Firm*—R. G. Brodahl

[57] ABSTRACT

A transportation vehicle for use in a mass transit system is provided with movable guidance wheels operative with a vehicle restraining guide beam included with the vehicle roadway, and which guidance wheels can be selectively moved into engagement or out of engagement with the guide beam to direct the vehicle onto one or another vehicle roadway.

14 Claims, 4 Drawing Figures

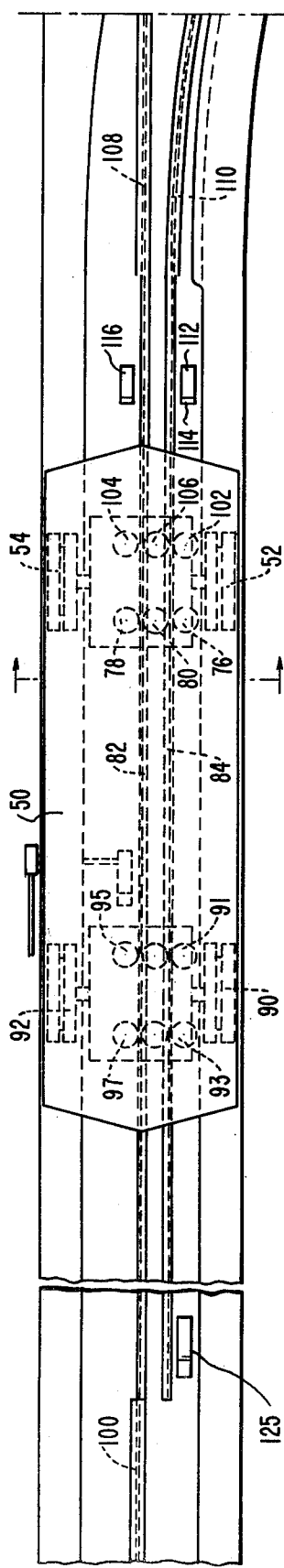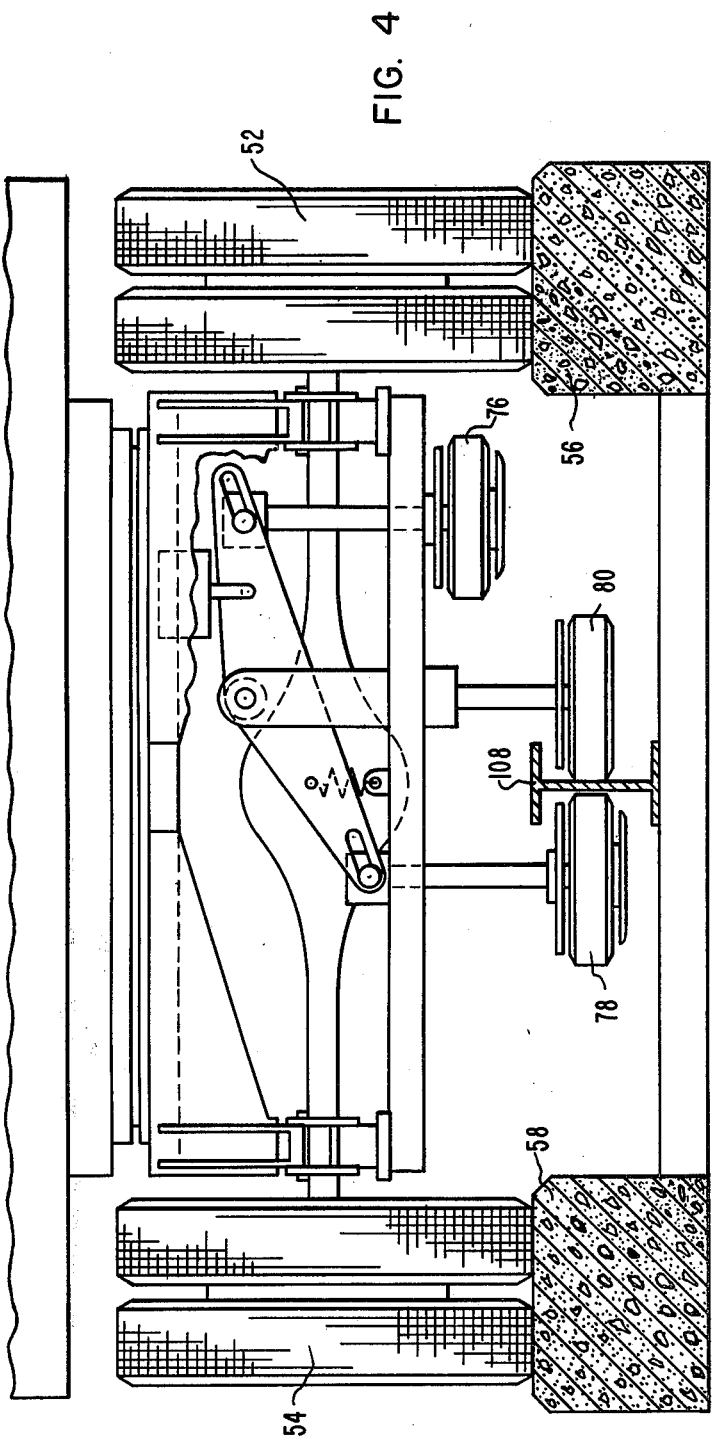

SWITCHING APPARATUS FOR MASS TRANSIT VEHICLE

BACKGROUND OF THE INVENTION

It is known to provide a rubber-tired mass transit vehicle which is controlled to self-steer along a guideway track or roadway having spaced track surfaces and a central restraining I-shaped guide beam, as disclosed in U.S. Pat. Nos. 3,312,180 of E. O. Mueller and 3,672,308 of W. R. Segar. The vehicle includes a plurality of guide wheels coupled with each support wheel axle mechanism and engaging the vehicle to the guide beam. The support wheel axles and the vehicle are in this way steered to follow the vehicle roadway.

It is also known to provide a section of the guide beam which is pivoted to switch selectively between a first roadway and a second roadway as desired to switch a mass transit vehicle to one of those first and second roadways as disclosed in copending patent application Ser. No. 638,001 filed Dec. 5, 1975 by W. R. Segar and entitled Pivotal Guide Beam Switch For A Transportation System and assigned to the same assignee as the present invention.

SUMMARY OF THE INVENTION

A mass transit vehicle is provided with movable and fixed guide wheels that selectively operate with a guide beam and with guide members fixed between the tracks of a vehicle roadway. Desired transfer switching of the vehicle between a first roadway and a second roadway is accomplished by actuating switching guide wheels on-board the vehicle to engage the proper guide member provided for this purpose.

BRIEF DESCRIPTION OF THE DRAWINGS

FIG. 2 is a top schematic view of a vehicle operative with the guide beam arrangement of FIG. 1;

FIG. 4 shows the guide wheel arrangement for the present mass transit vehicle while moving along a roadway having a central I-shaped guide beam.

DESCRIPTION OF A PREFERRED EMBODIMENT

Figure 1:
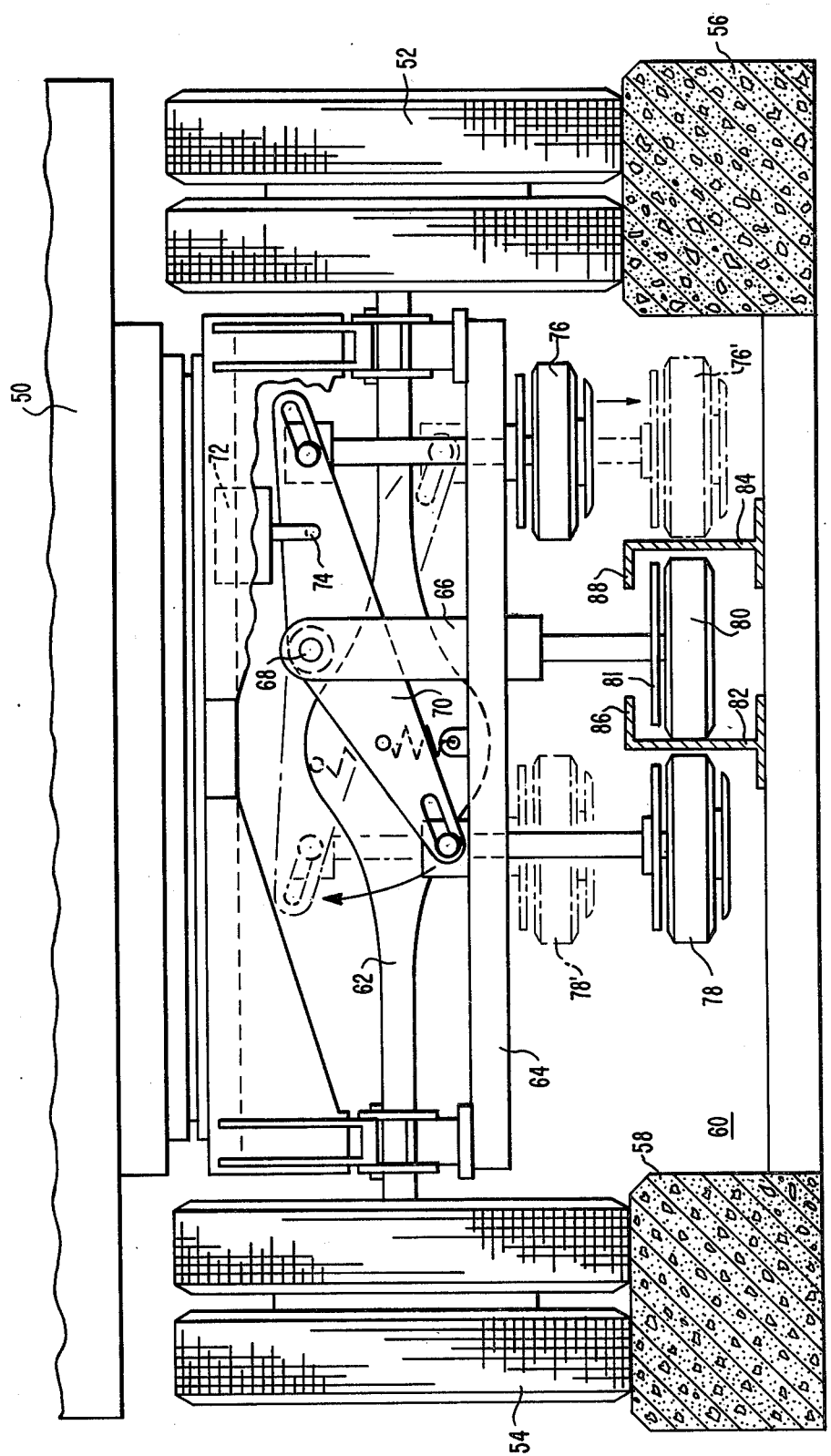
FIG. 1 shows a transverse section of the present vehicle guidance apparatus and a roadway structure including the guide beam arrangement to transfer the vehicle onto another roadway.

In FIG. 1 there is shown a mass transit vehicle 50 including support wheels 52 and 54 operative with respective tracks 56 and 58 of a roadway 60. The axle housing 62 of the vehicle 50 can be operative with a suitable drive axle and drive motor, not shown. A frame member 64 is fastened to the axle housing 62, and includes a support member 66 having a pivot 68 about which a switch arm 70 is pivoted. A switching apparatus 72, which can include a hydraulic piston or an electric motor and gear arrangement, is operative through connection 74 to move the connection 74 downward to lower the switching or second guide wheel 76 into wheel position 76′ and raise the movable or third guide wheel 78 into wheel position 78′ or to move the connection 74 upward to raise the switching guide wheel 76 and lower the movable guide wheel 78 into the positions 76 and 78 respectively shown in FIG. 1. A fixed or first guide wheel 80 is fastened to the frame member 64 and remains in a fixed position relative to that frame member 64. The guide beam, as shown in FIG. 1, includes a first guide member 82 and a second guide member 84. The guide member 82 has a top flange 86 such that the movable guide wheel 78 can move vertically in relation to the guide member 82 but the fixed guide wheel 80 with the adjacent safety disc 81 does not move above the guide member 82. The guide member 84 has a top flange 88 such that the switching guide wheel 76 can move vertically in relation to and above the guide member 84 but the fixed guide wheel 80 and safety disc 81 cannot move above the guide member 84. Thus, the fixed guide wheel 80 is contained by the guide members 82 and 84 to a position substantially as shown in FIG. 1 and in this way constrains the vehicle 50 to remain with the support wheels 52 and 54 operational with the respective tracks 56 and 58 if a strong wind, centrifugal forces or the like might try to move or lift the vehicle 50 in relation to the roadway 60.

The present invention relates to vehicle carried switching apparatus for automatically or manually controlled rubber-tired transit vehicles, for switching the vehicles from one roadway to another. The switching apparatus is suitable for the switching of vehicles with an above and below the guideway running surface guidance arrangement.

Switching of a vehicle is accomplished by actuating the switching guide wheel 76 on-board the vehicle to engage the proper roadway guide beam member 84. The vehicle can switch at the maximum system speed which is determined by the passenger ride comfort criteria and the roadway civil constraints. The vehicle to roadway positive lock-on feature is maintained at all times during the switching operation.

In traveling through the switch area, the vehicle will pass over small gaps in the guideway track surfaces. These gaps will not affect the ride quality of the vehicle, since the vehicle passes over the gaps at such an angle that each tire maintains tread contact of the tire load area on the guideway track surface.

The switch apparatus permits a vehicle or train to be transferred from the main line guideway track to a spur guideway track or to an off-line station. This transfer is achieved by the operation of switching guide wheels 76 on the vehicle to interface with the proper guide member 84 on the guideway track. These switching guide wheels 76 are mechanically interlocked with movable guide wheels 78 and are position monitored in a fail-safe manner to assure that the right guide wheels are in position prior to entering the switch area. All logic decisions and actuating members for the switching operation are operated from on-board the car.

On-board switching provides unique features over the prior art rubber tired transit vehicle guideway switches as follows:

a. Allows safe switching of vehicle cars operating on short headways. Switching does not require wayside information in the switch area.

b. Simplifies guideway track construction in the switch area with elimination of moving guide beam elements in the guideway track.

c. Eliminates the need for wayside intelligence to the vehicle car for safe switching.

d. Eliminates safety interlocking between the vehicle car and guideway as required on movable guide beam type switching to assure that the switching beams are in the proper position and locked.

e. Provides for a more flexible system operation with switching intelligence capability on the individual vehicle cars. Predetermined vehicle car route selection can be made without affecting other system operation.

f. Reduces guideway cost.

In FIG. 2 there is shown the vehicle 50 including the support wheels 52 and 54 and moving to the right as shown in the Figure. It is to be understood that additional support wheels 90 and 92 operate in a manner similar to support wheels 52 and 54, and this description will be in relation to the guide wheels associated with the latter vehicle wheels 52 and 54 but also applies to the functional operation of the similar guide wheels associated with the vehicle wheels 90 and 92.

The guide beam 100 is operative in accordance with the I-shaped vehicle guide beam disclosed in above U.S. Pat. No. 3,312,180 of E. O. Mueller and as generally shown in FIG. 4. The guide member 82 and the guide member 84 are similar to the guide beam arrangement shown in FIG. 1, and similarly operative with the guide wheels 76, 78 and 80 as previously described. As shown in FIG. 2, the pair of vehicle support wheels 52 and 54 is provided with two sets of guide wheels and the pair of vehicle support wheels 90 and 92 is provided with two sets of guide wheels which function similarly for switching the vehicle as desired. The switching guide wheel 76 is vertically movable in conjunction with the associated switching guide wheel 102. The movable guide wheel 78 is vertically movable in conjunction with the associated movable guide wheel 104. The fixed guide wheel 80 and the associated fixed guide wheel 106 remain fixed in position relative to the vehicle.

Assume that it is desired for the vehicle 50 to continue in a straight direction from the first roadway including the I-shaped guide beam 100 to the third roadway including the I-shaped guide beam 108. The movable guide wheels 78 and 104 remain in the normal lowered position as shown in FIG. 1, and the corresponding movable guide wheels 95 and 97 operative with support wheels 90 and 92 are similarly lowered, such that the guide member 82 directs the vehicle 50 into cooperation with the guide beam 108.

On the other hand, assume that it is desired for the vehicle 50 to switch onto the second roadway including the I-shaped guide beam 110. For this purpose the switching guide wheels 76 and 102 are lowered into the wheel position 76' shown in FIG. 1 and operative with guide member 84, and the corresponding switching guide wheels 91 and 93 operative with support wheels 90 and 92 are similarly lowered, such that the guide member 84 directs the vehicle 50 into cooperation with the guide beam 110.

If desired, a vertically operable ramp member 112 can be moved about a pivot hinge 114, such that should the switching guide wheels 76 and 102 of support wheels 52 and 54 and the corresponding set of switching guide wheel 91 and 93 of support wheels 90 and 92 be erroneously lowered when it is desired for the vehicle to move onto the roadway including the guide beam 108, as the vehicle moves to the right and passes over the ramp member 112, the latter ramp member 112 would become operative to raise mechanically those switching guide wheels 76 and 102 of the pair of support wheels 52 and 54 and then second to raise the switching guide wheels 91 and 93 as the support wheels 90 and 92 pass over the location of the ramp member 112. In this way the vehicle 50 would follow the guide member 82 onto the roadway including the guide beam 108.

On the other hand, should it be desired for the vehicle 50 to move onto the roadway including the guide beam 110, then the ramp member 112 would be lowered and not be operative mechanically to lift up the switching guide wheels 76 and 102 and the corresponding switching guide wheels 91 and 93; and instead a ramp member 116 could be raised and made operative mechanically to raise or lift up the movable guide wheels 78 and 104 as well as the movable guide wheels 95 and 97 for the purpose of following the guide member 84 onto the roadway including the guide beam 110.

Figure 3:
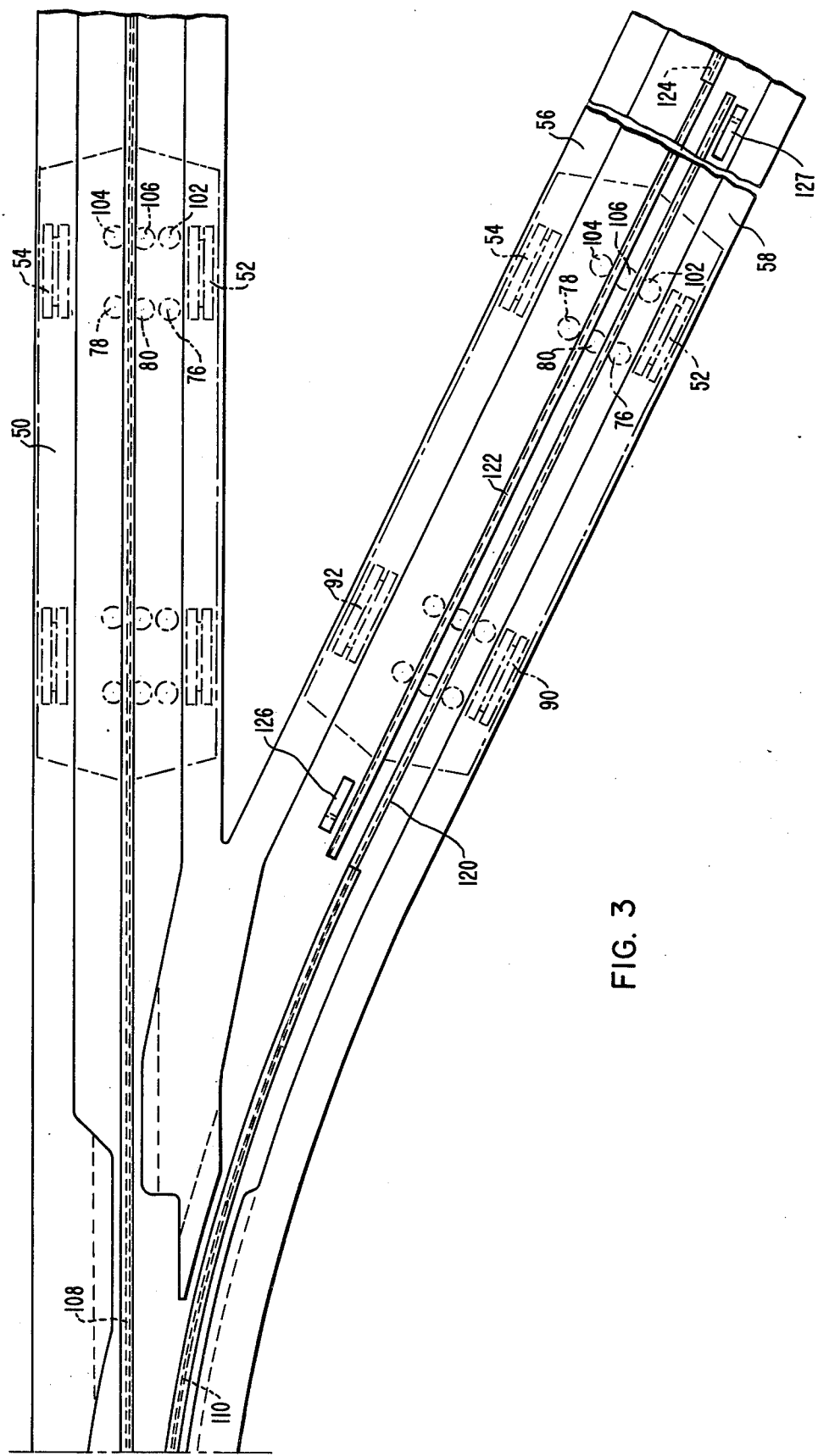
FIG. 3 shows the roadway arrangement for switching a vehicle onto one of a first roadway or a second roadway.

In FIG. 3 there is shown an extension of the respective roadways including the guide beams 108 and 110 to the right of the illustration shown in FIG. 2. In FIG. 3, the roadway including the guide beam 108 continues to the right, with the vehicle 50 shown moving along that roadway. It can be seen that the fixed guide wheels 80 and 106 are on one side of the I-shaped guide beam 108 and the movable guide wheels 78 and 104 are lowered into their normal positions to be on the other side of the guide beam 108 such as is generally shown in the illustration of FIG. 4.

If on the other hand, as shown in FIG. 3, the vehicle has switched onto the roadway including the guide beam 110 and is moving in a direction to the right of the drawing, it is now necessary to shift the guide wheel arrangement back to the condition of normal operation with a central I-shaped guide beam, since the switching guide beam 110 and its extension guide member 120 are not centrally positioned between the drive wheel tracks 56 and 58. This normal operation is accomplished by now raising the switching guide wheels 76 and 102 above the guide member 120 while lowering the movable guide wheels 78 and 104 of the support wheels 52 and 54 to be operative with the guide member 122, with the same functional guide wheel operation being provided in relation to rear support wheels 90 and 92. The guide member 122 directs the vehicle onto the roadway including the central I-shaped guide beam 124 and the vehicle can proceed on its way by normal operation along the roadway including the central I-shaped guide beam 124.

In FIG. 4 there is shown the normal and non-switching operation of the provided guide wheels when the vehicle is moving on a roadway including a central I-shaped guide beam, as generally disclosed in above U.S. Pat. No. 3,312,180 of E. O. Mueller. It should be noted that the top flange of the guide beam 108 effectively constrains the vehicle to remain on the roadway including the tracks 56 and 58.

The United States Government through UMTA has established the Automated Guideway Transit (AGT) technology program designed to investigate the technological areas which impacts the spectrum of AGT systems. One critical area where technological design must be accomplished to substantially improve the deployability of AGT systems is in vehicle switching capability. The on-board switching concept proposed in this patent application addresses the problems associated with providing a positive vehicle switching concept essential for safe system operation. The concept provides for a rapid switching capability which is desirable especially for systems operating at short headways (less than 30 seconds headway). The primary function performed by the here-disclosed on-board switching guide wheel operation is to switch the vehicle from one guideway to a side spur or another guideway by means of movable switching guide wheels 76 operated from controls on the vehicle or car. This eliminates the delays inherent in a movable guideway switching system which otherwise must transmit information between the wayside and vehicle assuring that the switch position is correct and that the switching mechanism is securely locked for safe traversing. Other considerations accomplished with the here-disclosed switching guide wheel operation include the dynamic performance goals required for various operating systems. The on-board switch will not restrict the anticipated levels of safety, ride quality, reliability and system performance up to the maximum line speeds. The wayside safety ramps 112, 116 and 125 provide the capability of reverse or drag through operation in the switch area such as could occur if the guide wheel switching mechanism fails.

The major criteria that passenger safety shall be the paramount design requirement for any transit system is fulfilled in the here-disclosed switching guide wheel operation. Positive retention of the vehicle to the guideway is provided at all times in both the switch areas and throughout the roadway system. Vehicle retention is provided in the event of such failures as guide tire failure, loss of power to switching actuator, loss of command to switching actuator, incorrect switching command at switch area or other related failures causing the switching mechanism not to function. The positive retention system functions under both normal and degraded conditions, including all combinations of inclement weather, grade, guideway curvature, and maximum overspeed. The switching control will include a fail-safe lock mechanism, with verification of right or left switch locking through the use of fail-safe lock detection. The on-board switching guide wheel operation is suited for turnouts in either direction as well as being suited for turnouts from or onto curved track.

In FIG. 2 there is shown a safety ramp 125 and in FIG. 3 there are shown safety ramps 126 and 127, which are provided to force physically the switching guide wheels and the movable guide wheels into proper position for entering or leaving the switching area associated with those safety ramps, should the switching mechanism or apparatus 72 fail in properly switching the switching guide wheels and the associated movable guide wheels. The switching guide wheels 76 can be locked by means of an overcentering or like arrangement if desired to keep the switching guide wheels 76 from undesired floating downward should a failure of the switching apparatus 72 occurr. The safety ramps assure that the switching guide wheels cannot in effect enter into the positional equivalent of an open switch condition of operation with the guide beam.

We claim:

1. In switching apparatus for a mass transit vehicle having support wheels and controllable to pass from a first roadway onto a selected one of a second roadway and a third roadway, with said apparatus including a pair of tracks for said support wheels, the combination of two guide members positioned between said tracks and with each of said guide members having a top flange, first guidance means connected to said vehicle and in substantially fixed position relative to said vehicle to pass between and cooperate with said two guide members, second guidance means connected to said vehicle and movable in position relative to said vehicle to be cooperative with one of said two guide members for controlling the vehicle to pass onto the second roadway, and third guidance means connected to said vehicle and movable in position relative to said vehicle to be cooperative with the other of said two guide members for controlling the vehicle to pass onto the third roadway.

2. The apparatus of claim 1, with said first guidance means including a guide wheel positioned to remain below the top flanges of the latter two guide members.

3. The apparatus of claim 1, with the second guidance means including a guide wheel movable between a first position below the top flanges of said two guide members and a second position above the top flanges of the latter two guide members.

4. The apparatus of claim 1, with
said first guidance means being positioned below the top flanges of said two guide members.

5. The apparatus of claim 1, with said third guidance means being coupled with the second guidance means such that when the second guidance means is positioned to be operative with said one guide member the third guidance means is positioned not to be operative with said other guide member and when the third guidance means is positioned to be operative with said other guide member the second guidance means is positioned not to be operative with said one guide member.

6. In apparatus for controlling a mass transit vehicle having support wheels to switch from a first roadway onto a second roadway, with said apparatus including a pair of tracks for said support wheels, the combination of two guide members positioned between said tracks and with each said guide member having a top flange, a first guide wheel connected to said vehicle in substantially fixed vertical position for operation relative to and between said two guide members, a second guide wheel connected to said vehicle and movable in vertical position relative to said two guide members and selectively operative with one of the latter guide members to provide a first predetermined operation of the vehicle in relation to the second roadway, and a third guide wheel connected to said vehicle and movable in vertical position relative to said two guide members and selectively operative with the other of the latter guide members to provide a second predetermined operation of the vehicle in relation to the second roadway.

7. The apparatus of claim 6, with the first guide wheel being operative to remain below the top flange of each of the latter guide members.

8. The apparatus of claim 6, with the second guide wheel being vertically movable between a first position below the top flange of each said guide member and a second position above the top flange of each said guide member.

9. The apparatus of claim 6, with said two guide members each having a top flange extending in a direction toward said first guide wheel, and with
said first guide wheel being operative below the respective top flanges of the latter two guide members.

10. The apparatus of claim 6, with the third guide wheel being coupled with the second guide wheel such that when the second guide wheel is raised above the top flanges of said two guide members the third guide wheel is lowered below the top flanges of the latter two guide members.

11. In apparatus for controlling a mass transit vehicle to pass from a first roadway onto a selected one of a second roadway and a third roadway, with said apparatus including a pair of tracks and a first elongated guide member and a second elongated guide member, with each said guide member being positioned between the roadway tracks and including a top flange, the combination of first guidance means connected to said vehicle in substantially fixed vertical position relative to each of the first and second guide members when the vehicle is passing through said apparatus such that the first guidance means passes between and along the length of the first and second guide members, second guidance means connected to said vehicle and movable in vertical position relative to the top flange of the first guide member for controlling the vehicle to pass onto the second roadway, and third guidance means connected to said vehicle and movable in vertical position relative to the top flange of the second guide member for controlling the vehicle to pass onto the third roadway.

12. The apparatus of claim 11, with the first guidance means including a guide wheel positioned to ride below the top flange of each said guide member, with the top flange of each said guide member extending toward said first guidance means.

13. The apparatus of claim 11, with the top flange of the first guide member permitting the second guidance means including a guide wheel to move between a first position above the top flange of the first guide member and a second position below the top flange of the first guide member.

14. The apparatus of claim 11, with said third guidance means being coupled with the second guidance means such that when the second guidance means is lowered to be operative with said first guide member the third guidance means is raised to be not operative with the second guide member and when the third guidance means is lowered to be operative with the second guide member the second guidance means is raised to be not operative with the first guide member.

* * * * *